United States Patent [19]

Bodart et al.

[11] Patent Number: 5,130,282
[45] Date of Patent: Jul. 14, 1992

[54] PROCESS FOR TREATING A SPENT NICKEL-BASED ABSORBENT

[75] Inventors: Philippe J. G. Bodart, Clermont Sous Huy; Guy Debras, Les Bons Villers, both of Belgium

[73] Assignee: Fina Research, S.A., Feluy, Belgium

[21] Appl. No.: 598,280

[22] Filed: Oct. 16, 1990

[30] Foreign Application Priority Data

Oct. 16, 1989 [BE] Belgium ............................... 8901116

[51] Int. Cl.$^5$ ............................................. B01J 20/34
[52] U.S. Cl. ............................................. 502/34; 502/53
[58] Field of Search ................................. 502/34, 53

[56] References Cited

U.S. PATENT DOCUMENTS 4,786,402 11/1988 Anstock et al. ........................ 502/53

FOREIGN PATENT DOCUMENTS 7017787 6/1970 Japan ..................................... 502/53

Primary Examiner—Melvyn J. Andrews
Attorney, Agent, or Firm—Michael J. Caddell; John K. Abokhair; M. Norwood Cheairs

[57] ABSTRACT

A spent absorbent material comprising a supported mixture of nickel oxide and metallic nickel may be reactivated a limited number of times by heating the material at 150°–450° C. under a flow of non-oxidizing gas.

3 Claims, No Drawings

PROCESS FOR TREATING A SPENT NICKEL-BASED ABSORBENT

CROSS REFERENCE TO RELATED APPLICATION

This application claims priority under 35 USC Section 119 of a previously filed foreign application which was filed in Belgium on October 16, 1989 and assigned the Serial No. BE/8901116.

FIELD OF THE INVENTION

The present invention relates to a process for treating a spent nickel-based absorbent. More particularly, the invention relates to a process for extending the, useful life of nickel-based absorbents.

SUMMARY OF THE INVENTION

A process for treating a spent absorbent material which originally consisted of a supported mixture of nickel oxide and metallic nickel, said process comprising the step of heating the spent material under a flow of non-oxidizing gas at a temperature of between 150° C. to 450° C.

PREFERRED EMBODIMENTS OF THE INVENTION

The Applicant has developed several processes for removing impurities from hydrocarbon feedstocks, which are based on absorption of said impurities on absorbent material comprising a supported mixture of nickel oxide and metallic nickel. However, it has not yet been possible to regenerate the absorbent material which must thus be replaced once its performance becomes insufficient.

Accordingly, there is a need in the art for a process for extending the useful life of an absorbent material comprising a supported mixture of nickel oxide and metallic nickel.

The process of the invention for reactivating a spent absorbent material, the fresh absorbent material comprising a supported mixture of nickel oxide and metallic nickel, comprises the step of heating the material under a flow of non-oxidizing gas at a temperature of from 150° to 450° C., preferably under a flow of hydrogen.

Absorbent materials comprising a supported mixture of nickel oxide and metallic nickel are well known in the art.

The absorbent material comprises nickel deposited on a support material, the nickel being present both as metallic nickel and as nickel oxide. Silica, silico-aluminas, alumina, kieselguhr, zeolites and other similar materials, whether amorphous or crystalline, can be utilized as the support. The total weight of nickel and nickel oxide may represent up to about 90 wt % of the absorbent material, with the provision that metallic nickel should not represent less than 1 wt % nor more than 50 wt % of the absorbent. Preferably, the weight ratio of metallic nickel to nickel oxide is of about 0.1 to about 10, and the absorbent comprises from about 10 to about 95 wt % of support material.

The specific surface area of the absorbent material is generally between 100 and 200 m²/g.

It is known that, when the fresh absorbent material is prepared ex situ, it must be either stored in non-oxidizing conditions or stabilized by adsorption of $CO_2$. In the latter case only, the fresh absorbent material stabilized by adsorption of $CO_2$ must be pretreated prior to its conditioning by passing therethrough, at a temperature of from about 150° to about 250° C. and preferably at about atmospheric pressure, a gaseous flow comprising an inert gas, preferably followed (if or in case said material was contacted with oxygen, even in traces) by a mixture of inert gas and hydrogen containing an increasing concentration of hydrogen, before purging it free of hydrogen with an inert gas flow. Such pretreatment is however neither necessary nor useful when the fresh absorbent material is either prepared ex-situ and stored in non-oxidizing conditions such as under oxygen-free inert gas or under an appropriate liquid like cyclohexane or dodecane, or prepared in situ.

Until now, it was generally believed that spent nickel-based absorbents could not be regenerated because they reacted irreversibly with the absorbed impurities. For example, it is believed that nickel-based absorbents absorb carbonyl sulphide (COS) by a process leading at least partially to the formation of nickel sulphide, which could not be regenerated to a fresh absorbent material.

Thus, it is surprising that it should be possible to reactivate nickel-based absorbent material, thereby extending its useful life, even if the reactivation cannot be repeated without limit.

The feedstocks mainly purified by passing them over the hereabove described absorbents are olefins, usually intended to be used in polyolefin production, and most often propylene feedstocks. The most important impurities removed from these feedstocks are carbonyl sulphide (COS) and arsine ($AsH_3$). Purification of olefin feedstocks for polymerization is becoming increasingly important because the latest generations of catalysts used in the polymerization processes are increasingly sensitive to impurities.

In polypropylene production, the hydrocarbon feedstock generally comprises more than 75 wt % propylene, more particularly from about 85 to about 99 wt % propylene, and impurities generally including up to about 100 ppm $H_2S$, up to about 100 ppm COS, and up to about 10 ppm arsine. The propylene feedstock is usually passed over the absorbent material at a temperature of from about −10° C. to about 80° C., preferably of from about 10° C. to about 40° C., and under sufficient pressure to keep the medium in the liquid phase. The weight hourly space velocity (WHSV) utilized is from about 0.1 to about 50 kg/kg.h and preferably from about 1 to about 30 kg/kg.h, depending on the purification requirements.

In polyethylene production, the hydrocarbon feedstock generally comprises more than 80 wt % of ethylene, more particularly from about 90 to about 99 wt %, and impurities generally including up to about 100 ppm $H_2S$, up to about 100 ppm COS, and up to about 10 ppm of arsine. The ethylene feedstock is usually passed over the absorbent material at a temperature of from about −10° C. to about 80° C., preferably from about 10° C. to about 40° C., under a pressure of at least 1 MPa, and with a WHSV of from about 0.1 to about 25 kg/kg.h, preferably of from about 1° to about 10° C. kg/kg.h.

DETAILED DESCRIPTION OF THE INVENTION

The process of the invention comprises, as an essential step, heating of the spent absorbent material under a flow of non-oxidizing gas. Although all non-oxidizing gases, exemplified by nitrogen, can be used, it is preferred to use hydrogen. The temperature during this step is of from 150° C. to 450° C., preferably of 200° to 300° C. The other parameters are not as critical: the duration of the heating step should be of at least one hour; there is little advantage in extending it over 24 hours; the gas flow should be sufficient, preferably such that at least one mole of gas is passed over the material per mole of metallic nickel; excessive space velocities, e.g. GHSV > 1000 l/l.h, offer no advantage over lower values; the pressure can vary within wide limits, atmospheric pressure or slightly above being preferred for practical reasons.

The Applicant has not detected hydrogen sulphide in the effluent gases during reactivation of spent sulphur-containing absorbent material. Thus, while not wishing to be bound by a theory, this may indicate that reactivation occurs through migration phenomena that produce a fresh absorbent surface. This would seem to be confirmed by the limited number of reactivation cycles that may be carried out before the absorbent loses its properties. Another hypothesis is that carbon deposited during the COS absorption process would be removed.

EXAMPLES

The examples which follow are given in order to provide a better illustration of the process of the present invention, but without thereby restricting its scope.

EXAMPLE I

A liquid hydrocarbon feedstock containing 99.5% of propylene, less than 5 ppm of water, and a residual COS content of 100 ppm was passed over an absorbent material consisting of 43.9% by weight of silica-alumina as the support, on which 50 wt % nickel was deposited, the nickel being present in the form of NiO and of metallic Ni, the amount of metallic nickel being of 25 wt %.

The fresh absorbent material was under the form of extruded trilobes of 1.6 mm diameter. The specific surface area of this material was 150 m$^2$/g, while its bulk density was of 0.8. It was stored under cyclohexane and pretreated by passing nitrogen thereon during 15 hours at a temperature of 200° C., under atmospheric pressure and at a gaseous hourly space velocity (GHSV) of 250 l/l.h.

The above mentioned feedstock was thus passed through the absorbent material at a temperature of 25° C., under a pressure of 1.5 MPa (15 bars) sufficient to keep the feedstock in the liquid phase and at a LHSV (liquid hourly space velocity) of 6 l/l.h.

The purified feedstock had a COS content as shown in Table I. Assuming that all COS was absorbed, the amount of sulphur on the absorbent was thus calculated.

TABLE I

| Hours | COS at the outlet | S absorption capacity (calculated on fresh absorbent) |
|---|---|---|
| 0 | 0.02 ppm | |
| 360 | 30 ppm | 7.3 wt % |

After 360 hours, the spent absorbent material was reactivated by passing nitrogen thereon during 24 hours at a temperature of 200° C., under atmospheric pressure, and at a GHSV of 250 l/l.h.

The reactivated absorbent was cooled under nitrogen flow, and passage of the feedstock was then resumed under the same conditions as above (Table II).

TABLE II

| Hours (total onstream) | COS at the outlet | S absorption capacity (calculated on fresh absorbent) |
|---|---|---|
| 360 | 0.025 ppm | 7.3 wt % |
| 393 | 5 ppm | 7.9 wt % |
| 425 | 20 ppm | 8.6 wt % |
| 433 | 30 ppm | 8.75 wt % |

EXAMPLE 2

In this example, the absorbent material and the pretreatment thereof, the feedstock and the purification conditions were as in Example 1.

The feedstock was passed over the fresh absorbent for 400 hours, when the calculated amount of sulphur on the absorbent was of 8.1 wt %.

The spent absorbent was then reactivated by passing a gaseous flow thereon, at a temperature of 200° C., under atmospheric pressure and with a GHSV of 250 l/l.h, said gaseous flow being formed first of nitrogen during 4 hours, then of hydrogen during 24 hours followed by nitrogen during another 24 hours, cooling to 25° C. and finally passing nitrogen containing 1 vol % of propylene during 12 hours.

Passage of the liquid feedstock was then resumed under the same conditions as above (Table III).

TABLE III

| Hours | COS at the outlet | S absorption capacity (calculated on fresh absorbent) |
|---|---|---|
| 0 | 0.02 ppm | 8.1 wt % |
| 104 | 5 ppm | 10.2 wt % |
| 115 | 10 ppm | 10.4 wt % |
| 131 | 30 ppm | 10.7 wt % |

During reactivation, no H$_2$S was detected in the effluent gases.

EXAMPLE 3

In this example, the feedstock and the purification conditions were as in Example 1.

The fresh absorbent material consisted of 13.2 wt % of nickel deposited on a support, the nickel being in the form of nickel oxide and of metallic nickel, and the amount of metallic nickel being of 10.8 wt %. This material was under the form of 1.6 mm trilobe extrudates having a specific area of 184 m$^2$/g while its bulk density was of 0.8. It was stored under CO$_2$ and pretreated by passing a gaseous flow thereon, at a temperature of 200° C., under atmospheric pressure and at a GHSV of 250 l/l.h, said gaseous flow being formed first of nitrogen during 24 hours then of hydrogen during 3 hours, before cooling it under nitrogen flow and finally passing nitrogen containing 1 vol % of propylene during 12 hours at 25° C.

The reactivation procedure consisted of passing a gaseous flow under atmospheric pressure and with a GHSV of 250 l/l.h on the spent absorbent material, in the following sequence: nitrogen, until the heated material reaches 200° C. hydrogen, at 200° C. during 1 hour then at 250° C. during 3.5 hours (no H$_2$S being detected in the effluent gases) nitrogen, until the material has cooled to room temperature nitrogen containing 1 vol % of propylene during 12 hours.

The performance of the absorbent material were as follows (Table IV).

TABLE IV

| Hours (onstream) | COS at the outlet | S absorption capacity (calculated on fresh absorbent) |
|---|---|---|
| 0 | 0.025 ppm | 0 wt % |
| 116 | 20 ppm | 2.3 wt % |
| reactivation | | |
| 116 | 0.028 ppm | 2.3 wt % |
| 240 | 20 ppm | 4.85 wt % |
| reactivation | | |
| 240 | 0.03 ppm | 4.85 wt % |
| 261 | 20 ppm | 5.3 wt % |

A chemical analysis of the spent absorbent material after 260 hours showed a sulphur content of 4.6 wt %, rather in agreement with the calculated value of 5.3 wt %.

What is claimed is:

1. A process for regenerating a spent absorbent material used in the removal of carbonyl sulfide, hydrogen sulfide and arsine from olefinic feedstocks, said spent absorbent material originally consisting of a support material composed of silica, silico-aluminas, alumina, kieselguhr or zeolites deposited with a mixture of metallic nickel and nickel oxide in a weight ratio of about 0.1 to 10 and wherein the spent absorbent material comprises from about 10 to about 95 wt. % of the support material, said process comprising the step of heating the spent absorbent material for at least one hour under a flow of non-oxidizing gas at a temperature of between 200° C. to 300° C.

2. The process according to claim 1, wherein the non-oxidizing gas is hydrogen.

3. The process according to claim 1, wherein the non-oxidizing gas is nitrogen.